United States Patent [19]
Egli et al.

[11] 4,394,831
[45] Jul. 26, 1983

[54] HELMET METAL MASS COMPENSATION FOR HELMET-MOUNTED SIGHTING SYSTEM

[75] Inventors: Werner H. Egli, Minneapolis; Jeffrey M. Setterholm, Minnetonka; E. Jack Weir, Roseville, all of Minn.

[73] Assignee: Honeywell Inc., Minneapolis, Minn.

[21] Appl. No.: 233,747

[22] Filed: Feb. 12, 1981

[51] Int. Cl.³ .......................... F41G 9/00; G01R 33/02
[52] U.S. Cl. .................................. 89/41 EA; 324/260; 324/225
[58] Field of Search ............ 89/41 EA; 324/260, 261, 324/262, 207, 208, 225

[56] References Cited

U.S. PATENT DOCUMENTS

| | | | |
|---|---|---|---|
| 2,824,304 | 2/1958 | Dorsett | 343/117 R X |
| 3,432,751 | 3/1969 | Godby et al. | 324/260 |
| 4,017,858 | 4/1977 | Kuipers | 343/100 R |
| 4,054,881 | 10/1977 | Raab | 324/227 X |
| 4,146,196 | 3/1979 | Schultz | 244/3.1 |
| 4,287,809 | 9/1981 | Egli et al. | 89/41 EA |

*Primary Examiner*—Theodore M. Blum
*Attorney, Agent, or Firm*—Trevor B. Joike

[57] ABSTRACT

An electromagnetic system for determining the orientation including position of a helmet worn by a pilot is disclosed having a transmitting antenna for transmitting electromagnetic field vectors, a receiving antenna for sensing the electromagnetic field vectors generated by the transmitting antenna, and a control apparatus responsive to the sensed electromagnetic field vectors and the transmitted electromagnetic field vectors for determining the compensated orientation of the helmet, the compensated orientation relying upon the rotation matrix determined by a previous solution for the orientation of the helmet.

11 Claims, 17 Drawing Figures

Fig. 13 ional number of polynomial terms would have to be used. The present invention gives a simpler and more memory-saving solution to this problem, and is more accurate unless an unreasonable number of polynomial terms are used.

HELMET METAL MASS COMPENSATION FOR HELMET-MOUNTED SIGHTING SYSTEM

BACKGROUND OF THE INVENTION

This invention relates to a system for determining the orientation and position of a helmet, and, more particularly, to an electromagnetic arrangement especially suited for determining the orientation and position of a helmet such as that worn by the pilot of an aircraft as he visually follows a target and, still more particularly, to an electromagnetic arrangement as described above which is compensated for any field perturbations caused by the metal of the helmet.

The present system involves the type of control apparatus disclosed in copending application Ser. No. 68,296 filed on Aug. 20, 1979, issued as U.S. Pat. No. 4,287,809, for sensing the orientation of a helmet, particularly for the pilot of an aircraft, to control various functions of the vehicle in which the helmet is worn. This control is based upon the target at which the wearer is looking. For example, the orientation of the helmet may be used to control the direction of fire for a Gatling gun on a helicopter, to input target location data into the guidance systems of air-to-air or air-to-ground missiles and-/or to aid the radar system of an aircraft in locking on to a selected target. The helmet may include a reticle generator used by the pilot to visually line up the target so that the helmet will follow his head movements.

The above-mentioned copending application also discloses a method for compensating for any distortion caused by helmet metal mass. It is suggested therein that the distortion caused by the pilot's helmet is fixed and its effect needs only to be calculated once. It is further stated therein that helmet distortion had not been taken into account in the programs disclosed since the effects of metal mass were assumed to be negligible. It was suggested, however, that if helmet metal mass materially affected performance, it could be compensated for by generating a fixed set of electromagnetic field vectors for each helmet orientation and comparing the predicted received signal with the actual received signal for determining a distortion matrix. This compensation technique would have involved rather clumsy polynomial mapping of all the various orientations which a helmet could have assumed within the cockpit and thus have required substantial memory for storing a distortion matrix based upon each possible substantive helmet orientation. In order to obtain accuracy, an unreasonable number of polynomial terms would have to be used. The present invention gives a simpler and more memory-saving solution to this problem, and is more accurate unless an unreasonable number of polynomial terms are used.

SUMMARY OF THE INVENTION

The present invention involves an electromagnetic system for determining the orientation (which definition can also be defined as orientation and/or translation) of a helmet having a transmitting antenna for transmitting electromagnetic field vectors, the transmitting antenna having at least two transmitting coils, a receiving antenna mounted to the helmet and having three non-coplanar receiving coils for sensing the electromagnetic field vectors transmitted by the transmitting antenna, and an apparatus connected to the receiving antenna for determining the orientation of the helmet based upon the sensed and transmitted electromagnetic field vectors, the apparatus also compensating the orientation by an amount related to the error in the orientation caused by the metal mass of the helmet.

BRIEF DESCRIPTION OF THE DRAWINGS

These and other features and advantages will become more apparent from a detailed consideration of the invention when taken in conjunction with the drawings in which.

DETAILED DESCRIPTION

Figures 3, 12:
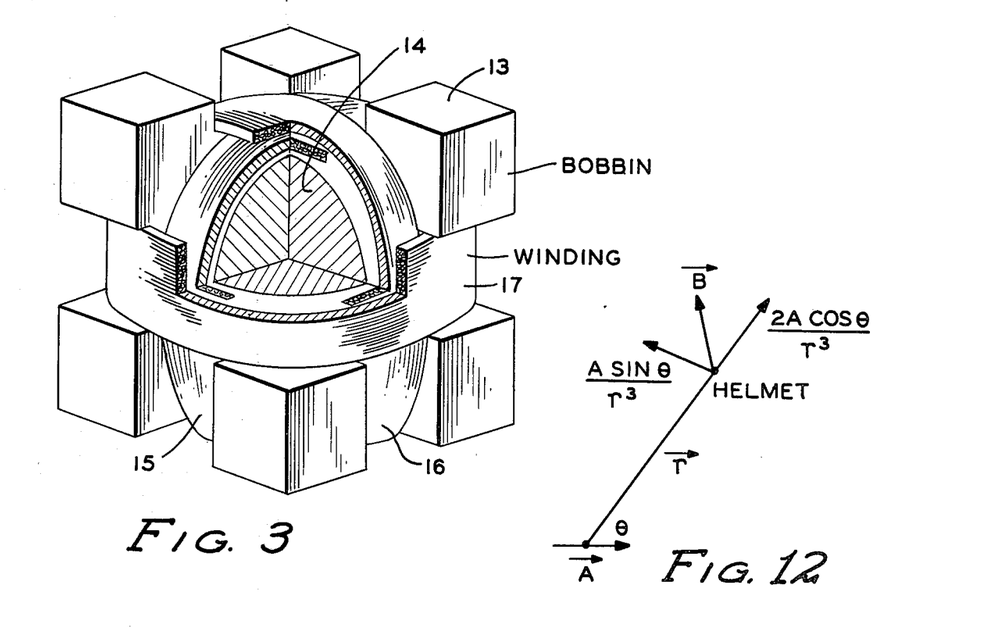
FIG. 3 is a drawing of an antenna which may be used for transmitting or receiving the electromagnetic field vectors used by the invention to determine helmet orientation.
FIG. 12 is a diagram showing the transmitted vector from a dipole antenna and the received magnetic field vector useful in the mathematical analysis of the instant invention.

In determining the orientation of the receiving antenna, which is mounted to a helmet, with respect to the transmitting antenna which transmits the electromagnetic field vectors, it is first assumed, as shown in FIG. 12, that an ideal magnetic dipole transmitter transmits a magnetic moment defined by the vector $\vec{A}$ whose magnitude represents the dipole strength and whose direction represents the dipole orientation. The magnetic potential at vector distance $\vec{r}$ may then be represented by the following equation:

$$\Phi(\vec{r}) = \vec{A} \cdot \vec{r}/R^3 = \frac{A\cos\theta}{R^2} \quad (1)$$

where R is the magnitude of $\vec{r}$ and A as the magnitude of $\vec{A}$. The magnetic field vector may then be determined by taking the gradient of the magnetic potential shown in equation (1). If the negative of the gradient is taken along polar coordinates, the following equation results:

$$\vec{B}(r) = \vec{U_r}\frac{2A\cos\theta}{R^3} + \vec{U_\theta}\frac{A\sin\theta}{R^3} \quad (2)$$

where $\vec{U_r}$ is the unit vector in the $\vec{r}$ direction and $\vec{U_\theta}$ is the unit vector in the $\theta$ direction. The $\vec{U_\theta}$ component can be resolved into the $\vec{A}$ and $\vec{U_r}$ components as follows:

$$\vec{U_\theta}\frac{A\sin\theta}{R^3} = \frac{-\vec{A}}{R^3} + \vec{U}\frac{A\cos\theta}{R^3}. \quad (3)$$

Substituting equation (3) into equation (2) and combining terms, equation (2) becomes:

$$\vec{B}(r) = -\frac{\vec{A}}{R^3} + \vec{U}\frac{3A\cos\theta}{R^3} \quad (4)$$

$$= -\frac{1}{R^3}(\vec{A} - \vec{U}3\vec{A}\cdot\vec{U}) \quad (5)$$

$$= -\frac{1}{R^3}(\vec{A} - 3\vec{U}\vec{U}^\tau\vec{A}) \quad (6)$$

$$= -\frac{1}{R^3}(I - 3\vec{U}\vec{U}^\tau)\vec{A} \quad (7)$$

$$= -\frac{1}{R^3}M\vec{A} \quad (8)$$

where the subscript r has been dropped from the column vector $\vec{U_r}$, $M = I - 3\vec{U}\vec{U}^\tau$; and the superscript $\tau$ indicates the transpose.

$\vec{B}$ is sensed by a triad of pick-off coils mounted on the helmet which gives the components of $\vec{B}$ along the helmet triad axis, i.e. the value of $\vec{B}$ expressed in the helmet coordinate frame. To determine the helmet orientation and translation, which comprises six independent variables, we need at least six data points. If we generate three different $\vec{A}$ vectors at the transmitter, and observe the resulting nine components of $\vec{B}$ sensed by the helmet triad, we get nine data, which "overdetermines" the solution. However, the resulting redundancy is helpful in getting a least-squares fit in the presence of inevitable noise and error. The value of $\vec{B}$ is sensed by the helmet triad as:

$$\vec{C} = H\vec{B} = -\left(\frac{1}{R^3}\right)HM\vec{A} \quad (9)$$

where H represents the rotation matrix representing the helmet orientation relative to the transmitting antenna coordinate axes. For three transmit/receive sequences, using three different $\vec{A}$'s, and hence generating three different $\vec{C}$'s, the resulting three vector equations of form equation (9) may be combined into a single matrix equation:

$$Y = -\left(\frac{1}{R^3}\right)HMX \quad (10)$$

where X is a 3×3 matrix whose columns are the three $\vec{A}$ vectors and Y is a 3×3 matrix whose columns are the three $\vec{C}$ vectors. Since the rotation matrix represents the solution to the problem, equation (10) can be rewritten as:

$$H = -R^3 Y X^{-1} M^{-1}. \quad (11)$$

In equation (11), the Y matrix is known since this matrix is comprised of the measured quantities and the X matrix is known since this is comprised of the transmitted quantities. It is then necessary to solve for the M matrix and for $R^3$ in order to complete the calculation of the H matrix.

In computing the component values for the M matrix, it is convenient to first determine the major eigenvalue which is then used in turn to determine the components of the eigenvector useful in completing the components of the M matrix. To determine the eigenvalue, the rotation matrix term H is first eliminated from equation (11). Thus, equation (11) is rewritten as:

$$-\frac{1}{R^3}HM = YX^{-1}. \quad (12)$$

Equation (12) can also be rewritten as its transpose to yield the following equation:

$$-\frac{1}{R^3}(HM)^\tau = (YX^{-1})^\tau. \quad (13)$$

Next, equations (12) and (13) are multiplied together to yield the following equation:

$$\frac{1}{R^6}(HM)^\tau HM = (YX^{-1})^\tau YX^{-1} \quad (14)$$

Since the transpose of the product of two matrices is identical to the product of the transpose of the individual matrices taken in reverse order, since H is a rotation matrix such that its transpose is identical to its inverse, and since M is a symmetrical matrix such that its transpose is equal to itself, equation (14) can be reduced to the following:

$$\frac{1}{R^6}M^2 = (YX^{-1})^\tau YX^{-1} \quad (15)$$

The eigenvalues for equation (15) may be determined by solving the following equation:

$$DET(EI - (YX^{-1})^\tau YX^{-1}) = 0 \quad (16)$$

where E represents the eigenvalues. Equation (16) can be rewritten in the form:

$$E^3 - BE^2 - CE + D = 0 \quad (17)$$

where B, C and D represent the constants of the equation. Since it is necessary to solve only for the major eigenvalue, the following two equations are useful:

$$E_o = (\tfrac{1}{3})B \quad (18)$$

$$E_{n+1} = [E_n^2(E_n - B) + D]/C \quad (19)$$

where equation (18) represents a first guess for the major eigenvalue and is used in equation (19) where n is equal to 0 for the first computation of the major eigenvalue to repetitively solve for the major eigenvalue as n is increased from 0 to a number sufficiently large so that the change in the major eigenvalue becomes very small between iterations.

Having determined the eigenvalue, the main eigenvector U, is determined by first forming the adjoint matrix of the left hand side of equation (16) and then selecting in the adjoint matrix the column whose squared magnitude is the largest. Any column may be used but since any individual column may vanish at certain receiver locations, the largest squared magnitude is selected for computational accuracy. Next the eigenvector is normalized to represent the unit direction vector U according to the following equations:

$$|\vec{U'}| = \sqrt{(U'_1)^2 + (U'_2)^2 + (U'_3)^2} \quad (20)$$

$$U_1 = U'_1/|\vec{U'}| \quad (21)$$

$$U_2 = U'_2/|\vec{U'}| \quad (22)$$

$$U_3 = U'_3/|\vec{U'}| \quad (23)$$

where $U_1'$, $U_2'$ and $U_3'$ are the values of the selected components from the adjoint matrix yielding the largest $\vec{U}$ as determined by equation (20).

As discussed above, the matrix M can be described with the following formula:

$$M = I - 3\vec{U}\vec{U}^T \quad (24)$$

The inverse matrix, $M^{-1}$, can be written as:

$$M^{-1} = I - \frac{3}{2}\vec{U}\vec{U}^T = \quad (25)$$

$$\begin{bmatrix} 1 - (3/2)U_1^2 & -(3/2)U_1U_2 & -(3/2)U_1U_3 \\ -(3/2)U_1U_2 & 1-(3/2)U_2^2 & -(3/2)U_2U_3 \\ -(3/2)U_1U_3 & -(3/2)U_2U_3 & 1-(3/2)U_3^2 \end{bmatrix}$$

Thus, the values for $U_1$, $U_2$ and $U_3$ as derived from equations (21), (22) and (23) are inserted into equation (25) and the inverse matrix is computed.

A somewhat simpler method of determining $\vec{U}$ follows directly from the definitions of M and $M^2$:

$$M = I - 3\vec{U}\vec{U}^T = \begin{bmatrix} 1 - 3U_1^2 & -3U_1U_2 & -3U_1U_3 \\ -3U_1U_2 & 1-3U_2^2 & -3U_2U_3 \\ -3U_1U_3 & -3U_2U_3 & 1-3U_3^2 \end{bmatrix} \quad (26)$$

$$M^2 = (I - 3\vec{U}\vec{U}^T)^2 = I + 3\vec{U}\vec{U}^T = \quad (27)$$

$$\begin{bmatrix} 1 + 3U_1^2 & 3U_1U_2 & 3U_1U_3 \\ 3U_1U_2 & 1+3U_2^2 & 3U_2U_3 \\ 3U_1U_3 & 3U_2U_3 & 1+3U_3^2 \end{bmatrix}$$

$M^2$ can be determined by multiplying equation 15 by $R^6$ where R is determined from the equation:

$$R = \left( KG_TG_R \sqrt{\frac{6}{\sum_{ij} y_{ij}^2}} \right)^{\frac{1}{4}} \quad (28)$$

where $$\sum_{ij} y_{ij}^2$$

is the sum of the squares of all of the values in the input matrix, Y. Hence, we can compute $U_1$, $U_2$, and $U_3$ directly from a knowledge of $M^2$.

Either approach can be used to solve for the rotation matrix but the approach using equations 1-25 will be specifically used. Thus, the rotation matrix formula of equation (11) can be rewritten then in the following form:

$$H = -G^{-1}YX^{-1}M^{-1} \quad (29)$$

where G is dependent upon the range or distance of the receiving antenna from the transmitting antenna and is given by the following equation:

$$G^{-1} = \sqrt{\frac{1 + 3(U_1X_1 + U_2X_2 + U_3X_3)^2}{Y_1^2 + Y_2^2 + Y_3^2}} \quad (30)$$

Thus, all components of equation (29) are now known. The rotation matrix in terms of angles of rotation can be described as follows:

$$H = \begin{bmatrix} C\psi C\theta & S\psi C\theta & -S\theta \\ C\psi S\theta S\phi - S\psi C\phi & S\psi S\theta S\phi + C\psi C\phi & C\theta S\phi \\ C\psi S\theta C\phi + S\psi S\phi & S\psi S\theta C\phi - C\psi S\phi & C\theta C\phi \end{bmatrix} \quad (31)$$

where $\psi$ represents the azimuth angle, $\theta$ represents the elevation angle, and $\phi$ represents the roll angle of the receiving antenna. The letters S and C are abbreviations for the sine and cosine functions. Since the values for each of these components are known, these angles may be easily computed. For example, if the component in the second row, third column is divided by the component in the third row, third column, the cosine $\theta$ function may be cancelled out and $\phi$ can then be computed as the arctangent of these two components. Similarly, $\psi$ and $\theta$ may be computed.

Having determined the orientation angles of the coordinate frame for the receiving antenna, it is next necessary to determine the range, which is the distance between the receiving antenna and the transmitting antenna, to accurately describe the spatial orientation of the receiving antenna. This range may be determined by using the following equation:

$$R = (KG_TG_RG^{-1})^{\frac{1}{2}} \quad (32)$$

where K is a fixed system gain constant, $G_T$ and $G_R$ are the variable transmitter and receiver gains as set by the automatic gain control function and $G^{-1}$ is derived by using equation (30). In equation (30), X represents the transmission vector, Y represents the received vector and U represents the unit direction vector respectively. Once the range is known, the rectangular coordinates of the receiver can be determined in the X axis by multiplying $R \times U_1$, in the Y axis by multiplying $R \times U_2$ and in the Z axis by multiplying $R \times U_3$ where $U_1$, $U_2$ and $U_3$ are derived from equations (21)–(23).

These values now describe the complete spatial orientation of the receiving antenna and thus the helmet. The program listing attached as an appendix hereto may be used with the computer shown in FIG. 4 for performing these computations and for deriving the azimuth, elevation, and roll angles as well as the rectangular range coordinates.

It is possible that airframe fixed metal may result in error which is superimposed on the rotation matrix. Thus, the solution to airframe metal distortion is to map the inside of the cockpit by generating a known set of electromagnetic field vectors from a known transmitting antenna orientation and receiving these signals by a receiving antenna having a known orientation. Thus, the signals which the receiving antenna should receive can be predicted and the signals that the receiving antenna actually receives can be measured so that an error matrix can be developed for compensating for this source of error. The error matrix can be generated to be either multiplied with the rotation matrix or added to the measured matrix or the like. In the actual case covered by the program listing attached as an appendix hereto, a compensating matrix is generated which is equal to the product of the helmet rotation matrix and a delta matrix which is a function of the receiver location in the cockpit. As a result of the mapping of the aircraft cockpit, this delta function can be represented by a table look-up with interpolation or by a polynomial curve fit. The compensating matrix is then added to the Y input matrix to develop the true Y received vector matrix and is then inserted into the equations shown above so that the true rotation matrix can be determined.

Figures 1, 14:
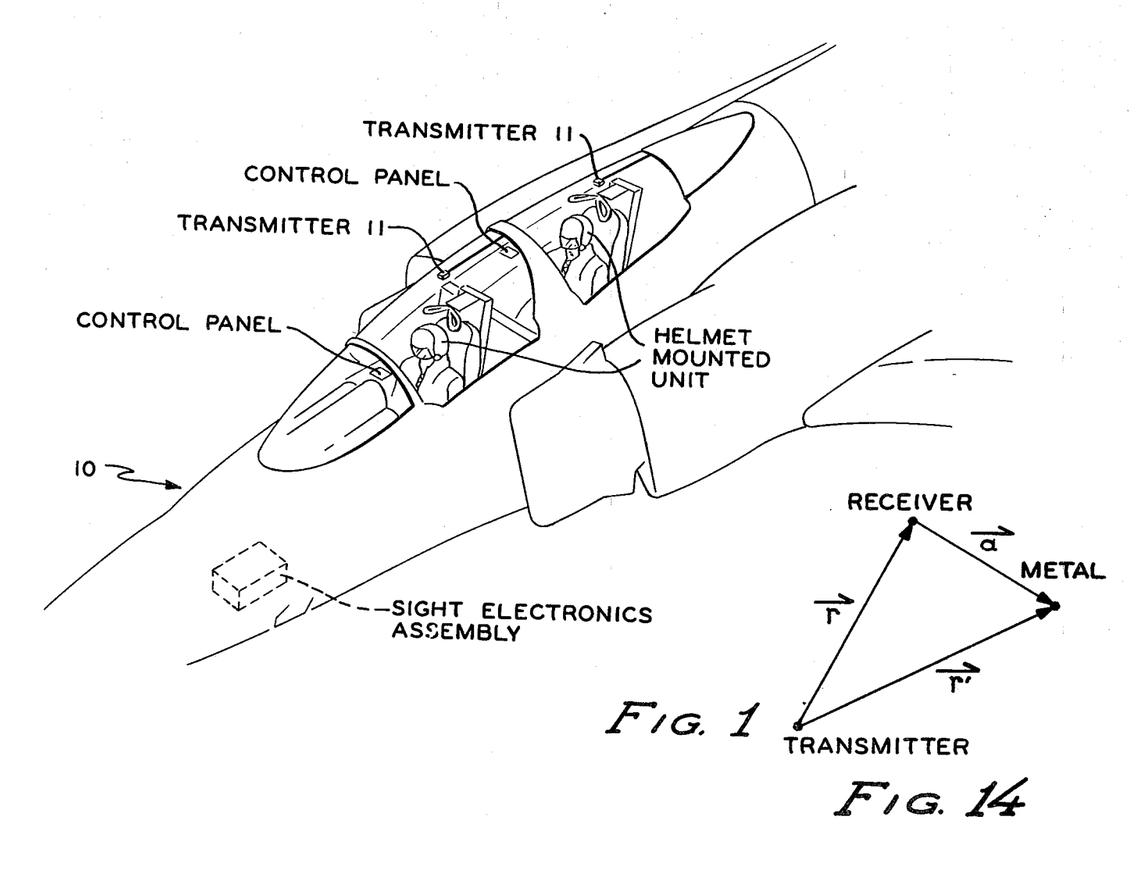
FIG. 1 is a drawing of an aircraft pilot wearing a helmet according to the instant invention.
FIG. 14 is a diagram showing the transmitted vector from the transmitter to the receiver and from the transmitter to the metal mass representing the helmet.
Figure 2:
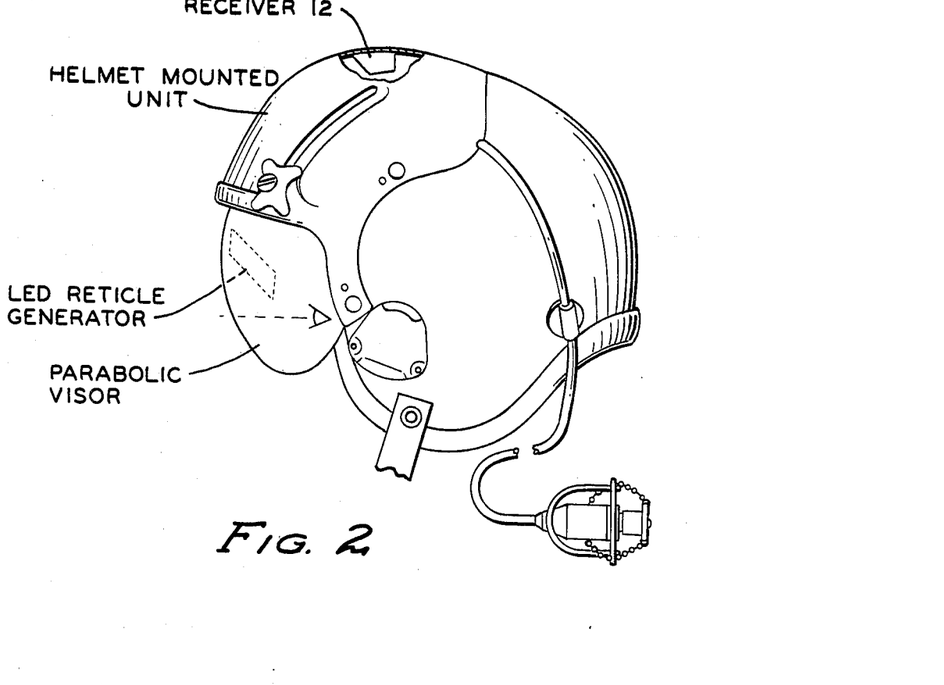
FIG. 2 is a drawing of the helmet according to the instant invention.

The system for implementing the determination of helmet orientation is shown with respect to FIGS. 1–13 and will now be described. In FIG. 1, a pilot and his navigator or co-pilot are seated within the cockpit of an aircraft 10. Included in the cockpit are the control panels as indicated, the transmitting antennas 11, and the receiving antennas which are mounted to the helmets. The electronics is included in the aircraft fuselage. The helmet is shown in more detail in FIG. 2 and includes the parabolic visor on which is projected a reticle which the pilot uses to sight on a target. A reticle generator is attached to the inside of the helmet visor housing for the purpose of projecting the reticle. The receiving antenna 12 is fixedly attached to the helmet visor housing and receives the electromagnetic field vectors generated by the transmitting antenna. Each of the transmitting antennas and the receiving antennas may take the form shown in FIG. 3. Bobbin 13 is structured as shown and has a spherical void internally thereof for holding the ferrite core 14. Around the core are wound the three coils 15, 16 and 17 which then form the triad antenna.

Figure 4:
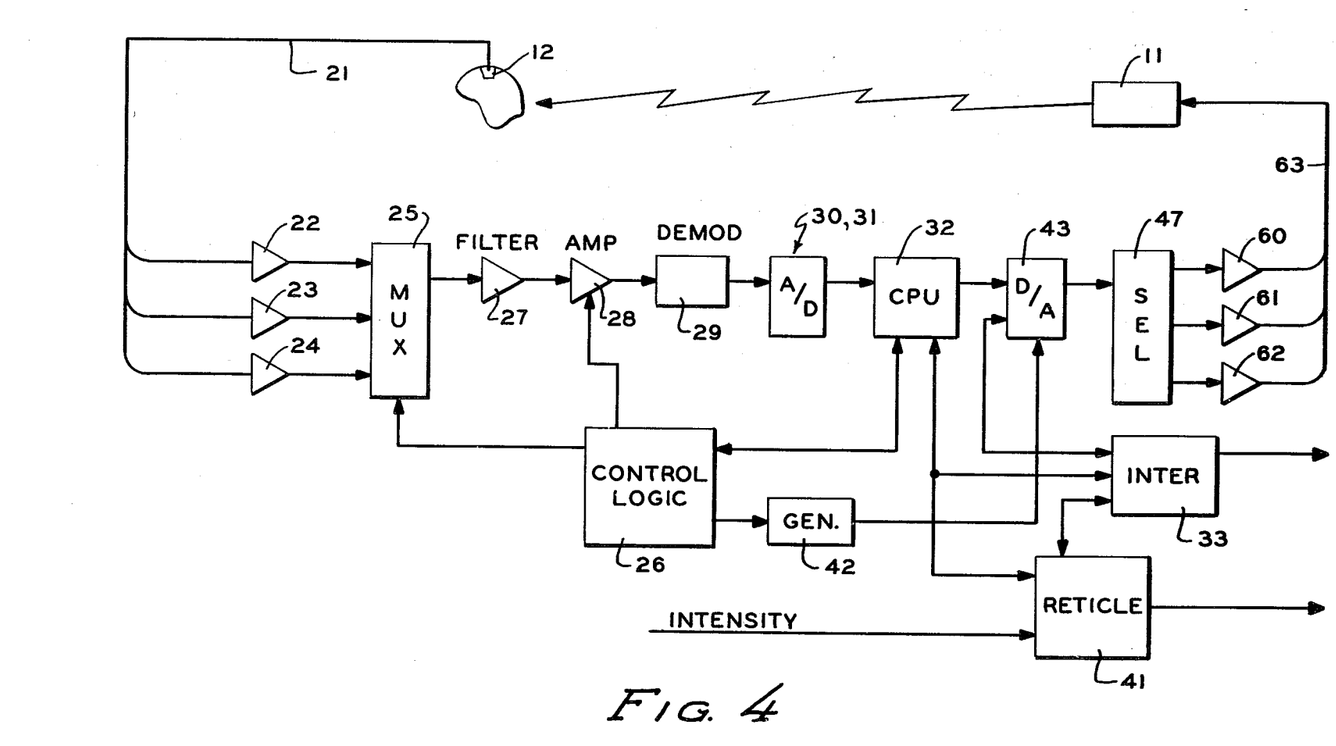
FIG. 4 is a block diagram of the system for carrying out the invention.

The system for determining helmet orientation is shown in block diagram form in FIG. 4. Receiving antenna 12 is connected over a cable 21 to pre-amplifiers 22, 23 and 24. One pair of lines in the cable is attached at one end to the X coil in antenna 12 and at the other end to pre-amplifier 22, a second pair of lines is attached at one end to the Y coil in antenna 12 and at its other end to pre-amplifier 23, and a third pair of wires in cable 21 is attached at one end to the Z coil in antenna 12 and at its other end to pre-amplifier 24. Since each of the pre-amplifiers is identical, only one pre-amplifier has been shown in detail in FIG. 5. The pre-amplifier involves a transformer front end and two stages of amplification for boosting the signal received from its associated coil of the receiving antenna to its output.

Figure 6:
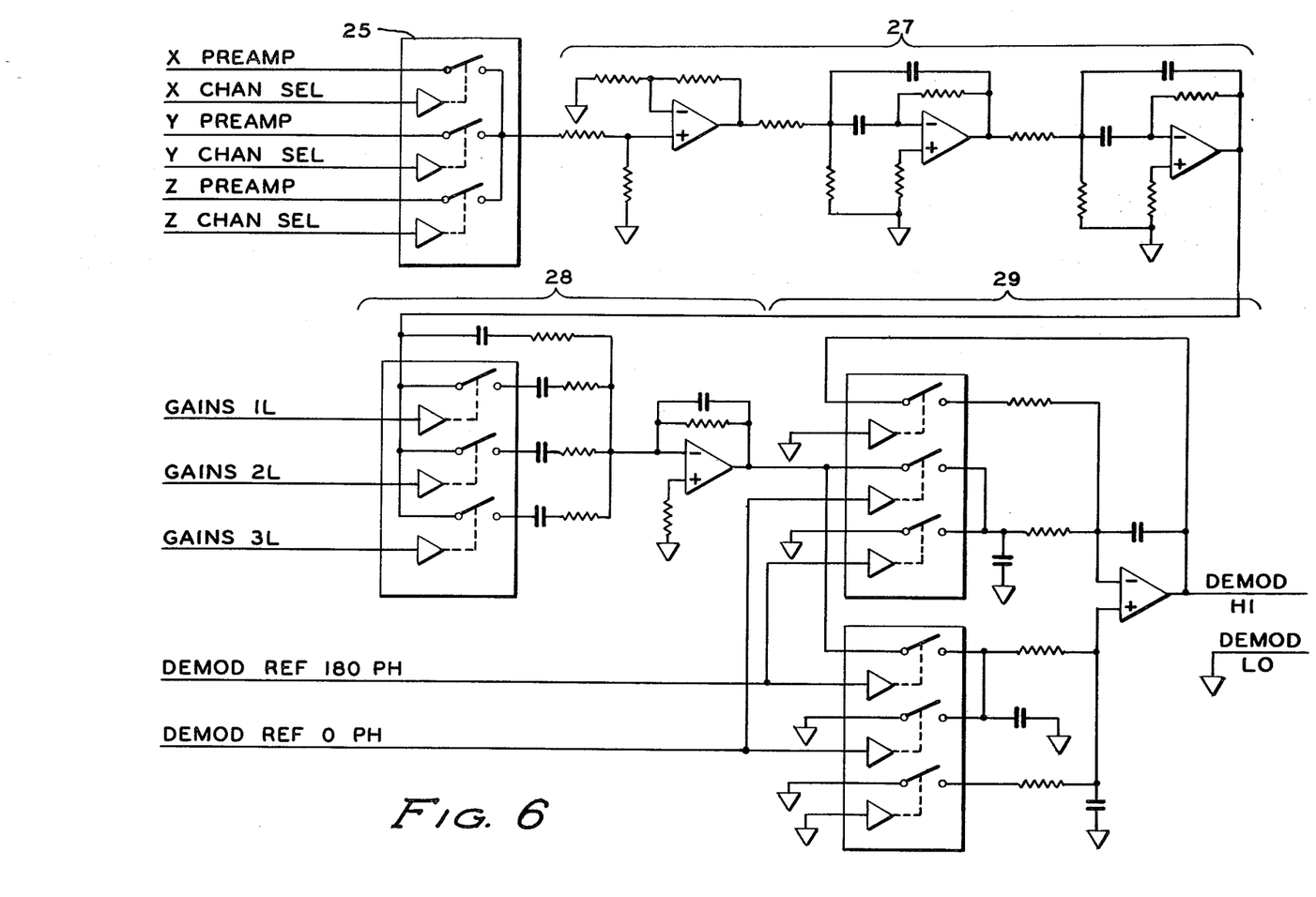
FIG. 6 is a schematic diagram showing the multiplexer, the bandpass filter, the gain control amplifier and the demodulator shown in FIG. 4.
Figure 7:
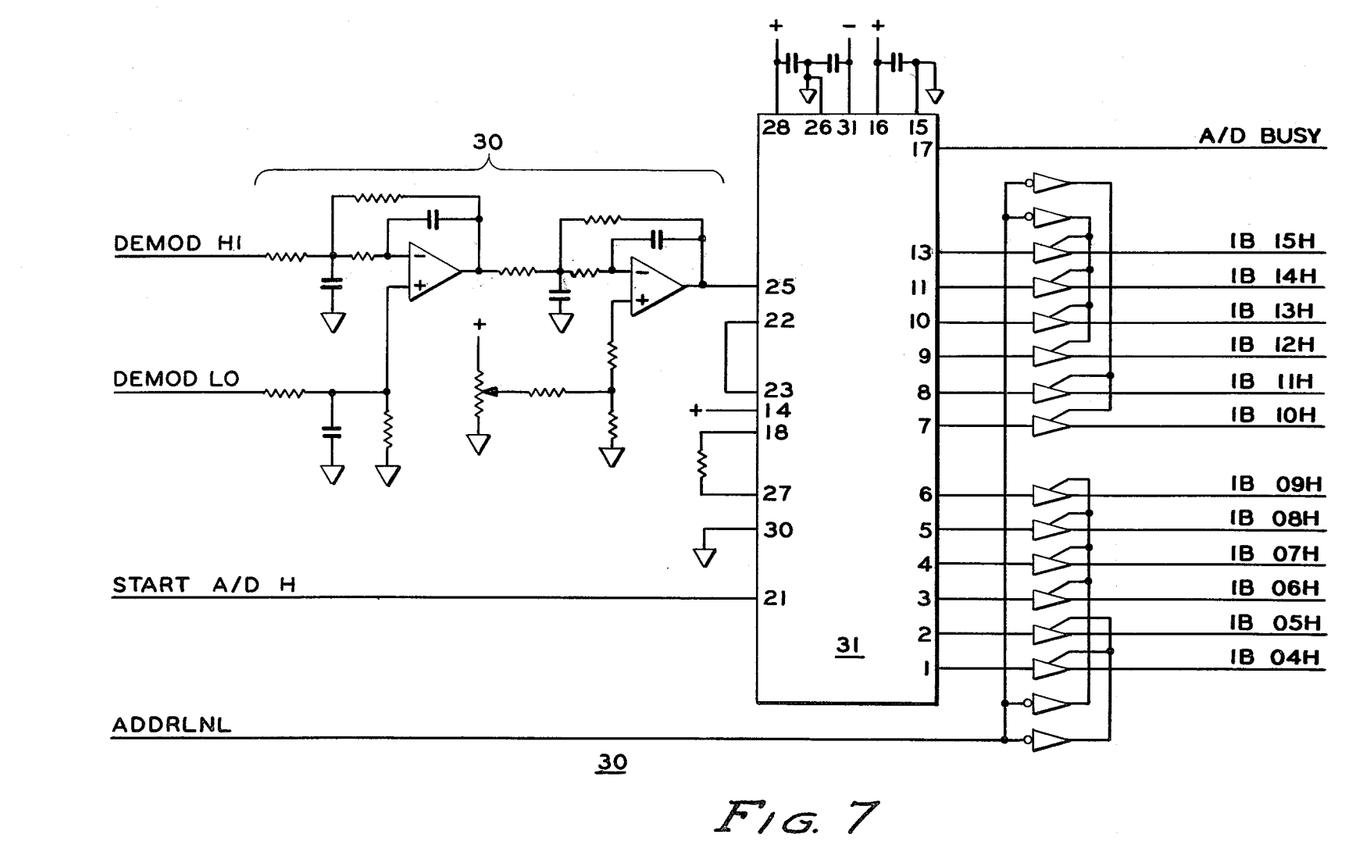
FIG. 7 shows the analog-to-digital converter shown in FIG. 4.

The output of each pre-amplifier is then connected to the input to multiplexer 25 which also receives an input from control logic 26. Control logic 26 selects which of the inputs to multiplexer 25 is to be connected to its output. The output of multiplexer 25 is then filtered by bandpass filter 27, amplified by a gain changeable amplifier 28 and demodulated by demodulator 29. FIG. 6 shows the details of multiplexer 25, bandpass filter 27, gain changeable amplifier 28 and demodulator 29. Connected to the three inputs of multiplexer 25 are the X, Y and Z pre-amplifier outputs which can then be switched selectively to the input of bandpass filter 27. The selection is made by the control logic which supplies appropriate signals over the X, Y and Z channel select lines. The signal connected to the input to bandpass filter 27 is then filtered and connected through gain changeable amplifier 28. The gain of the amplifier is selected over the three gain select lines as shown by control logic circuit 26. The output from amplifier 28 is demodulated by synchronous demodulator 29 which then supplies its output to the low pass filter and analog-to-digital converter 30, 31. As shown in FIG. 7, the analog-to-digital converter 31 samples the incoming analog signals and may be supplied under the standard part number AD 572 and is connected as shown. The start signal is derived from the control logic for the module 31 and its outputs are connected through a plurality of latches as shown and are then connected over a 12-bit bus to the input of the central processing unit 32. These latches are under the control of an input line which is also connected from the control logic circuit. Thus, when the computer wishes to read the information at the output of converter module 31, it gates the latches to pass the information through to the computer.

The processor may be a Honeywell HDP-5301 and may be programmed according to the program listing attached as the appendix to perform the computations as described above. The output from the computer is then connected through an interface circuit 33 which is then used to control the particular instrumentality of the vehicle to which it is connected, examples for which have been shown above. In addition, the computer controls a reticle control apparatus 41 which is manufactured by Honeywell is presently used on the YG11-76A01 IHADSS system.

Figure 9A:
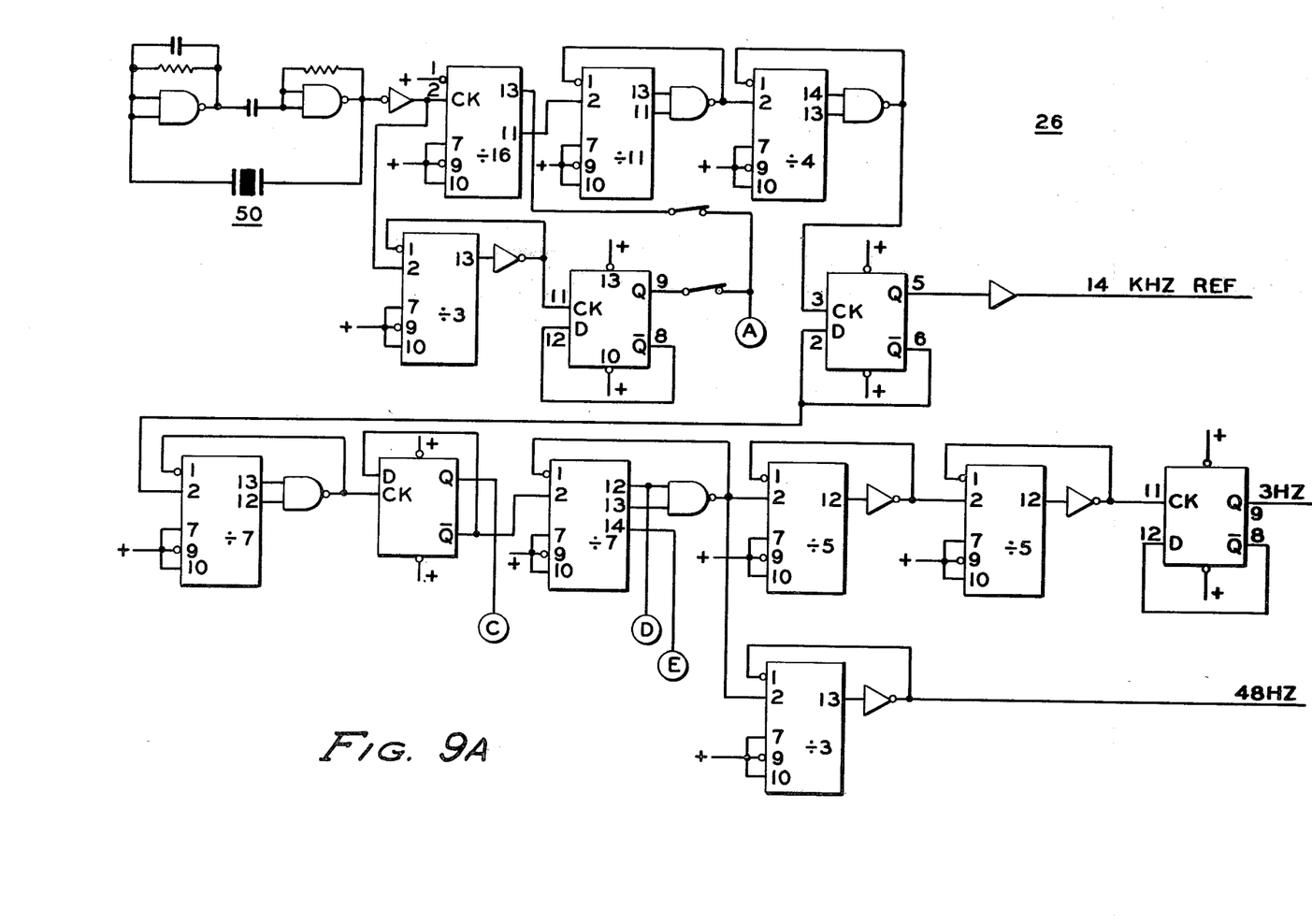
FIGS. 9A–9D show the control logic circuit shown in FIG. 4.
Figure 9B:
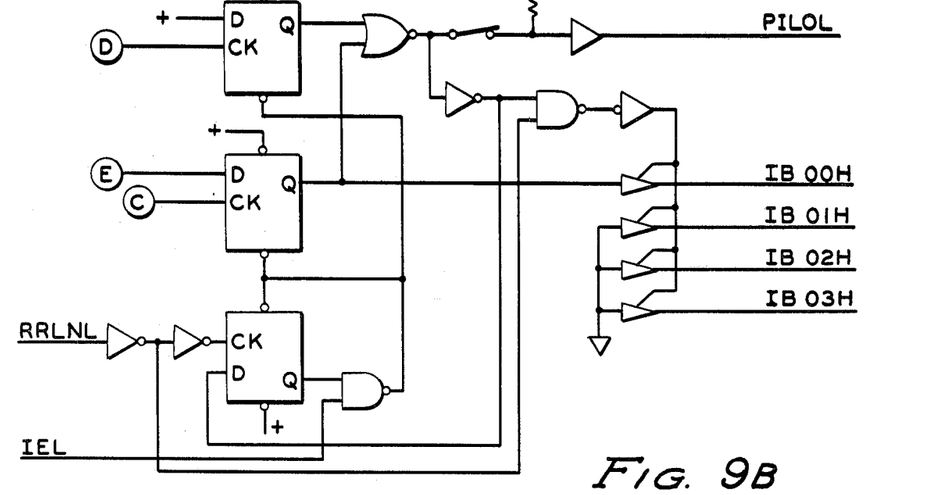

Control logic 26 is shown in more detail in FIGS. 9A–9D. This logic can be broken down into four major components as shown. The first component is shown in FIG. 9A and is the countdown logic which provides a plurality of output signals as shown based upon the 20 MHz oscillator 50. All of the dividers shown in this schematic may be purchased under the Standard Part Number 54LS74. The function of this circuit is to divide the 20 MHz signal from oscillator 50 into three signals having the frequency shown for use by the rest of the apparatus. The circuit shown in FIG. 9B is the computer interrupt circuit and is connected to the countdown logic as shown by the circled reference numerals and to two lines of the bus interconnecting the various circuits shown in FIG. 4 at RRLNL and IEL. This circuit provides input interrupt addresses IB00H-IB03H to the computer over the input bus as shown along with the real time interrupt PILOL.

Figure 9C:
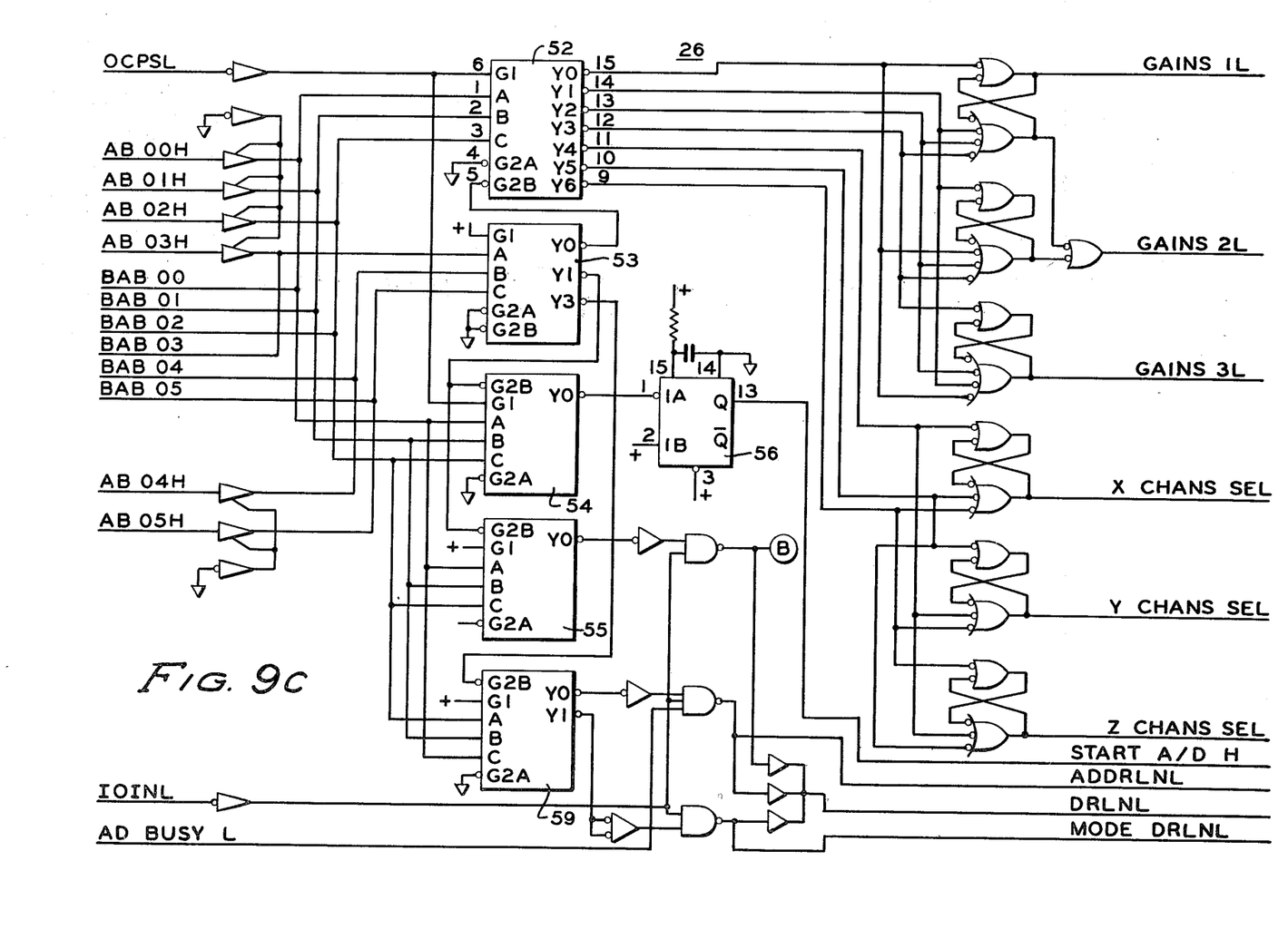
Figure 9D:
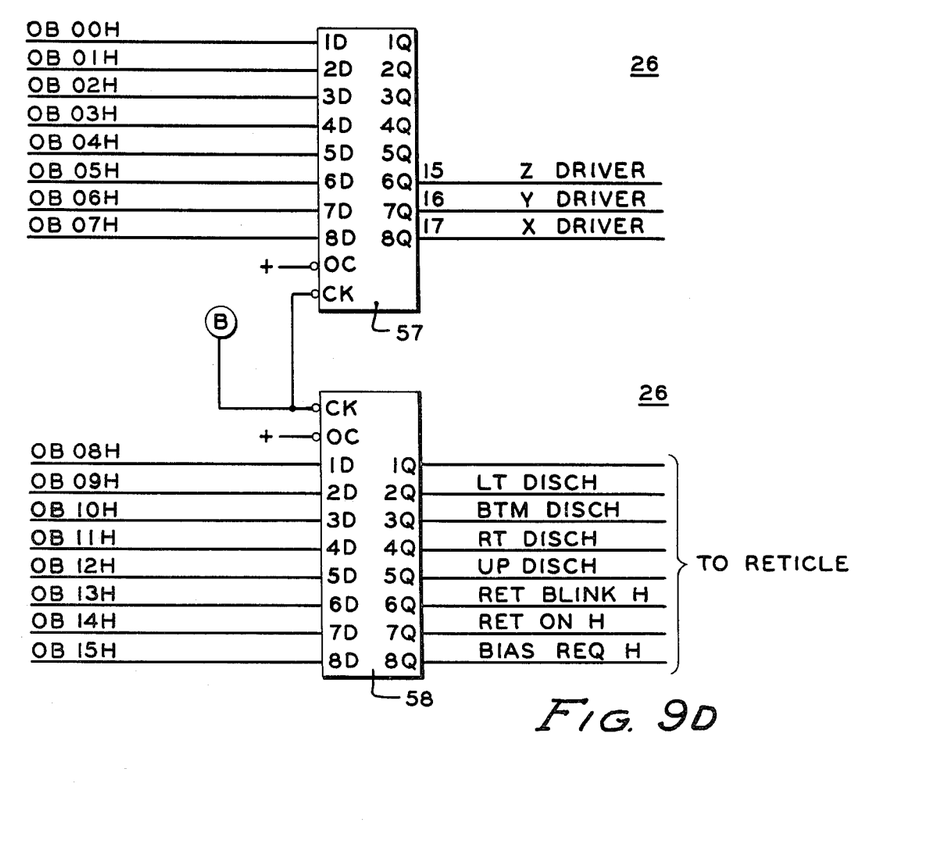
Figure 11:
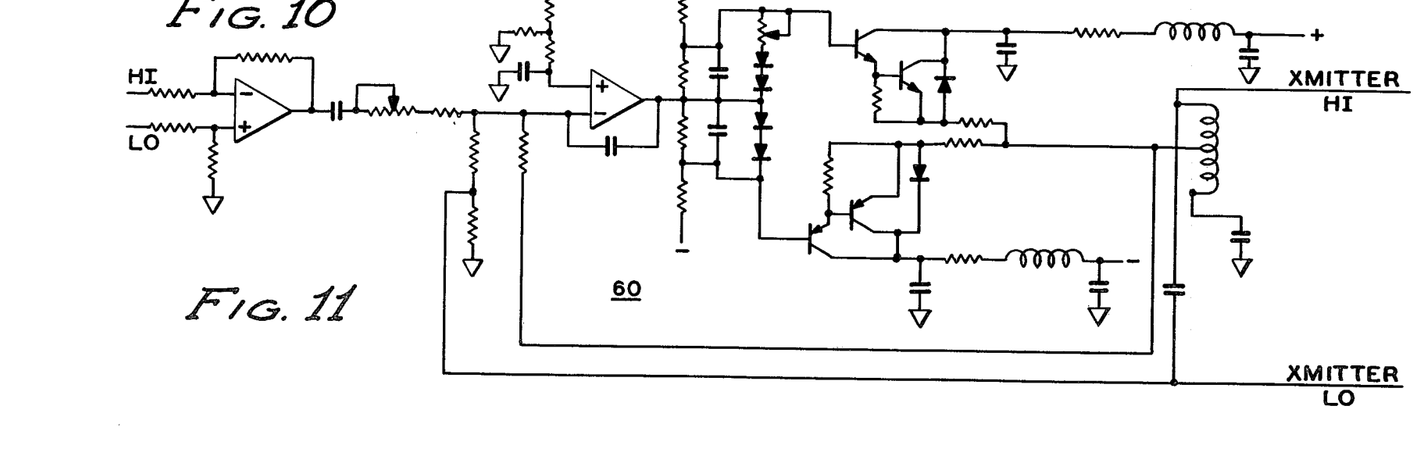
FIG. 11 is a schematic diagram of one of the driver amplifiers shown in FIG. 4.

FIG. 9C is the I/O address decode logic required to facilitate the use of the central processor to control the various blocks of I/O hardware. The computer will output specific addresses, ABXXH, to the input buffers along with an output pulse, OCPSL. The decoders 52 and 53 will decode the address and set a group of latches 26 as required to select the input channel or gain. Decoders 53 and 54 are used to start the A/D converter by outputting a pulse to a one shot (56). The output of the one-shot has the proper pulse width to start the A/D converter. Decoders 53 and 55 generate an output pulse on B that will load the registers 57 and 58 shown on FIG. 9D. Decoders 53 and 59 generate an output pulse ADDRLNL that will enable the output gates on the A/D converter shown in FIG. 7 and permit the central processor to read the contents.

The flip-flops in FIG. 9B may be manufactured under the Standard Part No. 54LS74 and the circuits 52, 53, 54 and 59 may all be manufactured under the Standard Part No. 54LS138. In addition, the flip-flop 56 may be manufactured under the Standard Part No. 54LS123 and is connected in a one-shot multivibrator configuration. Latches 57 and 58 may be supplied under the Standard Part No. 54LS374.

Figures 5, 10:
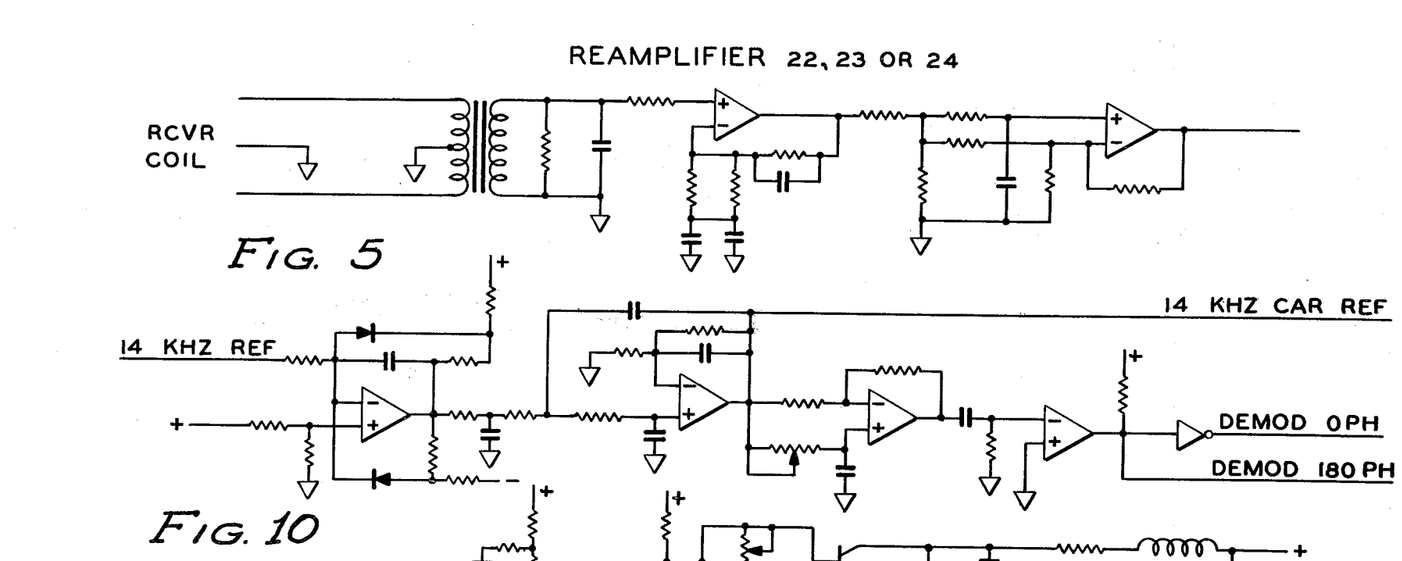
FIG. 5 is a schematic diagram of one of the preamplifiers shown in FIG. 4.
FIG. 10 shows the detailed schematic of the carrier reference generator shown in FIG. 4.

Carrier generator 42 shown in FIG. 4 is shown in more detail in FIG. 10 and receives the 14 KHz square wave reference signal from the output of the contol logic and shapes it into a 14 KHz carrier as a reference signal to digital-to-analog converter 43. In addition, the carrier generator supplies reference signals to the demodulator 29 as shown by the DEMOD OPH and DEMOD 180PH output lines from FIG. 10 and the same lines as inputs to FIG. 6.

Figure 8:
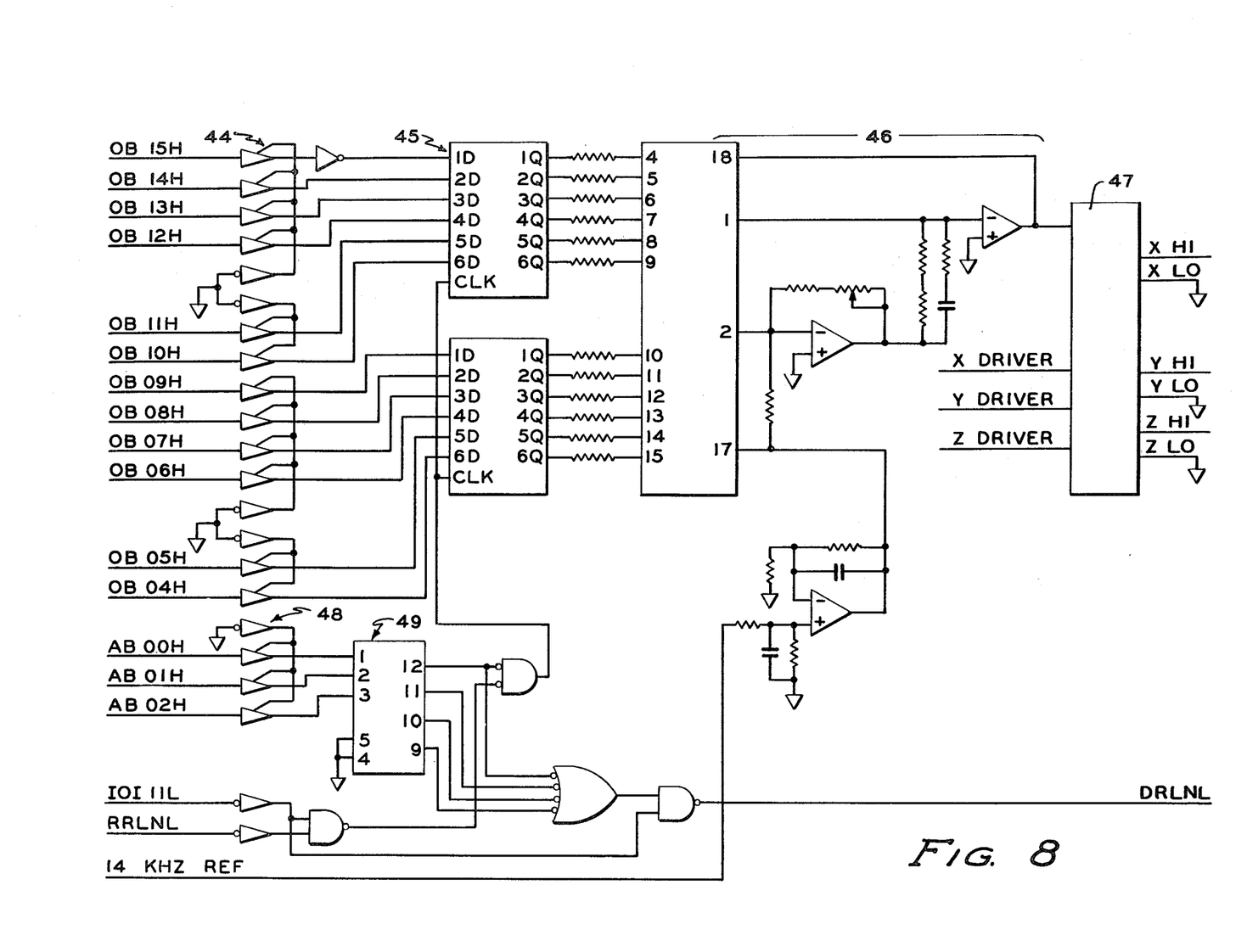
FIG. 8 shows the digital-to-analog converter shown in FIG. 4.

The digital-to-analog converter is shown in more detail in FIG. 8 and has a plurality of buffers 44 for buffering the outputs from computer 32 to the inputs of latches 45. The outputs from latches 45 are then connected to the digital-to-analog converter 46. The resistor ladder and switches may be supplied under the Standard Part No. 7541. The amplifiers on the output of the ladder network are current to voltage converters and are required as shown for bipolar output. The multiplex 47 is used to select which driver is used and is selectively stepped to the X, Y and Z outputs by computer control of the select inputs SEL. The 14 KHz reference signal from the output of carrier generator 42 is used as a reference signal to the D/A converter 46. In addition, a set of buffers 48 connect certain address lines of the address bus to decoder 49 which then provides the clock input to latches 45.

The X, Y and Z outputs from multiplex switch 47 are then connected to an appropriate driving amplifier 60, 61 and 62 respectively. Since these amplifiers are the same, only one is shown in detail in FIG. 11. The output of amplifier 60 is then connected over cable 63 to its associated coil in transmitting antenna. Thus, the two-wire output from amplifier 60 is connected through cable 63 to the X coil of transmitting antenna 11, the two-wire outut from amplifier 61 is connected through cable 63 to the Y coil of transmitting antenna 11, and the two-wire output from amplifier 62 is connected through cable 63 to the Z coil of transmitting antenna 11. These amplifiers simply boost the output signal from the selector switch 47 to sufficient power levels for energizing transmitting antenna 11.

Figure 13:
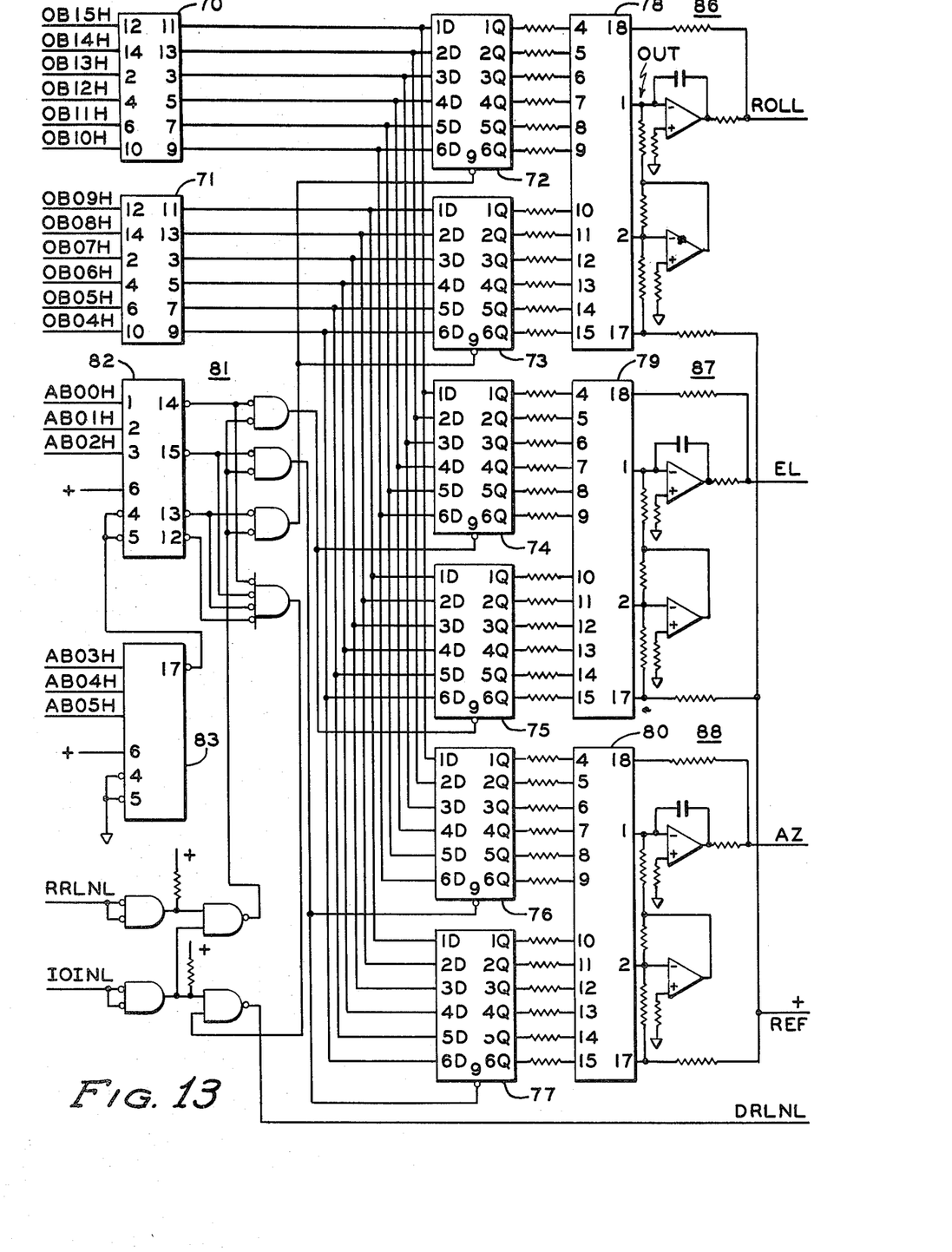
FIG. 13 shows the aircraft interface shown in FIG. 4.

FIG. 13 shows the aircraft interface 33 of FIG. 4 in more detail. This circuit comprises a pair of buffers 70 and 71 having inputs connected to the output bus of the processor and outputs connected to latches 72-77. Buffers 70 and 71 may be supplied under the Standard Part No. 54LS367. The outputs from latches 72 and 73 are connected to the inputs of digital-to-analog converter 78, the outputs from latches 74 and 75 are connected to the inputs of digital-to-analog converter 79 and the outputs from latches 76 and 77 are connected to the input of digital-to-analog converter 80. The clock terminal for latches 72-77, shown generally as terminal 9 thereof, are supplied by a decoding network 81 which is comprised of decoders 82 and 83 and a series of gates as shown. Decoders 82 and 83 may be supplied under the Standard Part No. 54LS138. This arrangement also provides the signal for the device ready line DRLNL. The output from converter 78 is amplified at 86 to provide the roll output, the output from converter 79 is amplified at 87 to provide the elevation output EL and the output from converter 80 is amplified at 88 to provide the azimuth output AZ. The roll, elevation and azimuth outputs are then used as inputs to whatever instrumentality of the aircraft is to be controlled.

The present compensation scheme is based on modeling the field perturbation at the helmet receiver as some matrix constant multiple of the field at the metal mass which field is produced by the transmitter. Symbolically, this field perturbation can be shown by the following equation:

$$\Delta = S\delta \vec{B} \tag{33}$$

where $\vec{B}$ is the field at the metal mass due to the transmitter, $\delta$ is the matrix constant, S is the composite electronic and system gain parameter scalar, and $\Delta$ is the field perturbation at the helmet receiver caused by the metal mass.

Since the metal mass is fixed in position and orientation relative to the helmet, as seen in the helmet coordinate frame, equation (33) is in helmet coordinates. In order to convert the field vector into cockpit coordinates, the following expression can be used:

$$\vec{B} = H\vec{B}_c \tag{34}$$

where $\vec{B}_c$ is $\vec{B}$ expressed in cockpit coordinates and H is the helmet orientation matrix. But, using the dipole matrix model as derived above, particularly with respect to equation (8), $\vec{B}_c$ at the metal mass can be expressed as:

$$\vec{B}_c = -M'X_i/(R')^3 \tag{35}$$

where $$M' = I - 3\vec{u}'\vec{u}'^\tau \tag{36}$$

$$\vec{U}' = \vec{r}'/R' \tag{37}$$

and where $\vec{r}'$ is the transmitter-to-metal mass vector, $R'$ is the magnitude of $\vec{r}'$, $\Gamma$ is the identity matrix, $X_i$ is the transmission signal strength on any of the three orthogonal transmissions, $\tau$ stands for the transpose of a vector matrix, and the ' represents the transmitter to metal mass vector as opposed to the transmitter-to-receiver vector shown in FIG. 14.

As explained above, when three transmissions are used, equation (35) becomes a matrix ensemble of the three orthoginal transmissions where the X and $B_c$ symbols now represent matrices. For implementational convenience, the computing, electronic and system gains are jointly configured so that X is an identity matrix. Thus, equation (35) reduces to:

$$\vec{B}_c = -M'/(R')^3 \tag{38}$$

Referring to FIG. 14, we see that:
$$\vec{r}' = \vec{r} + \vec{d} \tag{39}$$

where $\vec{r}$ is the transmitter-to-helmet receiver vector and $\vec{a}$ is the helmet receiver-to-metal vector. Furthermore, $\vec{a}$ as seen in the helmet frame is some constant, $a_o$. Thus, $$\vec{a}_o = H\vec{a} \tag{40}$$

Therefore, equation (39) becomes:

$$\vec{r}' = \vec{r} + H^T\vec{a}_o \tag{41}$$

By combining equations (33), (34) and (38), the $\Delta$ compensation factor can be defined as:

$$\Delta = -S\delta HM'/(R')^3 \tag{42}$$

where $R'$ is the magnitude of $\vec{r}'$ as defined in equation (41).

The field readings at the helmet receiver are adjusted by adding $\Delta$, and then processed in the computer to yield reduced-error values for H and $\vec{r}$. As can be seen from equation (42), it is necessary to know the rotation matrix H and $\vec{r}$ in order to compute $\Delta$. Of course, the present values of these quantities are affected by distortion caused by helmet metal mass and, therefore, the one cannot be computed before the other. As a practical matter, however, the $\Delta$ matrix is first computed assuming that there is no distortion. After the orientation matrix and the range are solved during the first iteration, the second iteration commences to solve for the $\Delta$ matrix, the rotation matrix and range. The $\Delta$ matrix is solved by using the rotation matrix solved during the first iteration. Then, the $\Delta$ matrix is used for solving for the present orientation of the helmet. During the third iteration, the rotation matrix solved during the second iteration is used for solving the $\Delta$ matrix during the third iteration. Thus, by using the rotation matrix solved during the prior iteration, the perturbation matrix of the present iteration is solved. Because of the iterative process, the error produced by using the prior rotation matrix for solving the present perturbation matrix converges. If the iterative process is rapid enough, any resulting error is negligible.

To solve equation (42), the scalar S may be given by the following expression:

$$S = KG_T G_R \tag{43}$$

where K is a constant dependent on fixed system gain, $G_T$ is transmitter gain based upon AGC functions, and $G_R$ is the receiver gain obtained from the AGC function. In order to calculate $\Delta$, the values of R, $\vec{u}$, and $H_o$ from the previous computation cycle are used where R is the range value from equation (32) derived from the previous computation, $\vec{u}$ is the unit receiver direction vector from the previous cycle and $H_o$ is the helmet rotation matrix from the previous computation cycle. Using these values, the $\vec{r}'$ can be computed by the following equation:

$$\vec{r}' = R\vec{u} + H_o^T \vec{a}_o \tag{44}$$

which is equation (41) where the r component has been replaced by its range and unit vector equivalent. Then, the magnitude of $r'$ can be solved according to the following equation:

$$|\vec{r}'| = [(r_0')^2 + (r_1')^2 + (r_2')^2]^{\frac{1}{2}} \tag{45}$$

which allows for solution of the corresponding unit direction vector according to the following expression:

$$\vec{u}' = \frac{\vec{r}'}{|\vec{r}'|} \tag{46}$$

Knowing the unit direction vector, the matrix M' can be solved according to the following expression:

$$M' = \begin{bmatrix} 1 - 3u_0'^2 & -3u_0'u_1' & -3u_0'u_2' \\ -3u_0'u_1' & 1-3u_1'^2 & -3u_1'u_2' \\ -3u_0'u_2' & -3u_1'u_2' & 1-3u_2'^2 \end{bmatrix} \tag{47}$$

Therefore, referring back to equation (42), the scalar factor S is known, the rotation matrix H is taken from the previous iteration, the matrix M' has now been computed and the term R' is known. The $\delta$ factor can be predetermined by the use of the program attached as Appendix B hereto. Since all the terms of equation (42) are now known, the $\Delta$ matrix can be solved. This perturbation matrix is then added to the uncompensated y matrix as determined in equation (10) for determining the compensated y matrix. This compensated y matrix then gives the substantially true orientation of the receiving antenna. Since the receiving antenna is fixed as a helmet, the y matrix also represents the compensated orientation matrix for the helmet.

The embodiments of the invention in which an exclusive property or right is claimed are defined as follows:

1. An electromagnetic system for utilizing electromagnetic field vectors in determining the orientation of a helmet, and for compensating for distortions of said electromagnetic field vectors caused by the metal mass of the helmet, the system comprising:
    transmitting means for transmitting electromagnetic field vectors, said transmitting means including a transmitting antenna having at least two transmitting coils;
    a receiving antenna having three non-coplanar receiving coils fixed to the helmet, said receiving coils sensing the electromagnetic field vectors transmitted by said transmitting antenna; and,
    control means responsive to said electromagnetic field vectors received by said receiving antenna for iteratively determining helmet orientation compensated for distortions of said electromagnetic field vectors caused by helmet metal mass, said control means having an output for supplying said compensated orientation to a utilization means.

2. The system of claim 1 wherein said control means comprises a multiplexer having three inputs, one input connected to a corresponding receiving coil and having an output.

3. The system of claim 2 wherein said control means comprises an analog-to-digital converter means having an input connected to the output of said multiplexer and having a converter output.

4. The system of claim 3 wherein said input of said analog-to-digital converter means comprises a bandpass filter having an input connected to the output of said multiplexer and an output.

5. The system of claim 4 wherein each of said inputs of said multiplexer comprises a corresponding preamplifier.

6. The system of claim 5 wherein said input of said analog-to-digital converter means further comprises a gain changeable amplifier having an input connected to the output of said bandpass filter and an output.

7. The system of claim 6 wherein said control means further comprises computer means having an input connected to the output of said analog-to-digital converter means and further having said first output connected to said utilization means and a digital-to-analog converter having said second output.

8. The system of claim 1 wherein said control means further comprises computer means having an input connected to the three coils of said receiving antenna and further having said first output connected to said utilization means and a digital-to-analog converter having said second output.

9. The system of claim 1 wherein said control means comprises an analog-to-digital converter for converting the analog signals received by the receiving antenna into digital form for use by said control means.

10. An electromagnetic system for utilizing electromagnetic field vectors in determining the orientation of a helmet worn by the pilot of a vehicle, and for compensating for distortions of said electromagnetic field vectors caused by the metal mass of the helmet, the system comprising:

transmitting means for transmitting said electromagnetic field vectors, said transmitting means including a transmitting antenna having at least two transmitting coils;

a receiving antenna having three non-coplanar receiving coils fixed to said helmet for sensing said electromagnetic field vectors transmitted by said transmitting antenna;

orientation determining means connected to said receiving antenna and to said transmitting means for iteratively determining a compensated orientation matrix for the receiving antenna by relying upon the rotation matrix for the rotation of the receiving antenna from the transmitting antenna of a previous iteration, said compensated orientation matrix being comprised of an orientation matrix which is compensated for distortions of said electromagnetic field vectors caused by helmet metal mass, said orientation matrix and said rotation matrix being based upon both the transmitted electromagnetic field vectors and the sensed electromagnetic field vectors; and, output means connected to said orientation determining means for providing an output signal for the control of a vehicle apparatus.

11. The system of claim 10 wherein said orientation determining means comprises means for compensating the orientation of the receiving antenna according to the formula $$\Delta = -S\delta HM'/(R')^3$$

where $\Delta$ is the compensation factor, S is a scalar based upon electronic and system gain, $\delta$ is a matrix constant, H is the rotation matrix of a previous iteration, M is a matrix based upon the unit direction vectors between the receiving antenna and the transmitting antenna, and $R'$ is the range from the metal mass to the transmitting antenna.

* * * * *